US008549401B1

(12) United States Patent
Hernacki et al.

(10) Patent No.: US 8,549,401 B1
(45) Date of Patent: Oct. 1, 2013

(54) SYSTEMS AND METHODS FOR AUTOMATICALLY GENERATING COMPUTER-ASSISTANCE VIDEOS

(75) Inventors: Brian Hernacki, San Carlos, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 748 days.

(21) Appl. No.: 12/414,233

(22) Filed: Mar. 30, 2009

(51) Int. Cl.
*G06F 3/00* (2006.01)

(52) U.S. Cl.
USPC .......................................... 715/705; 715/719

(58) Field of Classification Search
USPC ................................................ 715/709, 705
See application file for complete search history.

(56) References Cited

U.S. PATENT DOCUMENTS

| | | | | |
|---|---|---|---|---|
| 5,948,869 | A * | 9/1999 | Vallieri et al. ................. | 525/338 |
| 6,243,090 | B1 * | 6/2001 | Machiraju et al. ............ | 715/709 |
| 6,609,038 | B1 * | 8/2003 | Croswell et al. ............... | 700/83 |
| 6,973,482 | B2 * | 12/2005 | Mohammed et al. ......... | 709/208 |
| 7,730,132 | B2 * | 6/2010 | Ludwig et al. ................ | 709/204 |
| 2006/0265656 | A1 * | 11/2006 | Lambert et al. ............... | 715/705 |
| 2007/0300179 | A1 * | 12/2007 | Friedlander ................... | 715/781 |
| 2009/0132918 | A1 * | 5/2009 | Deyo et al. .................... | 715/705 |
| 2009/0132920 | A1 * | 5/2009 | Deyo et al. .................... | 715/708 |
| 2009/0150779 | A1 * | 6/2009 | Kodama et al. ............... | 715/708 |
| 2009/0228379 | A1 * | 9/2009 | Honts et al. ................... | 705/30 |
| 2010/0077481 | A1 * | 3/2010 | Polyakov et al. .............. | 726/24 |
| 2010/0199781 | A1 * | 8/2010 | Colby et al. ................ | 73/861.09 |

OTHER PUBLICATIONS

Dale Farris, Camtasia v. 3.0.1, Feb. 2002, downloaded from http://www.gtpcc.org/gtpcc/camtasia.htm, pp. 1-8.*

* cited by examiner

*Primary Examiner* — Omar Abdul-Ali
(74) *Attorney, Agent, or Firm* — ALG Intellectual Property, LLC

(57) ABSTRACT

Computer-implemented methods, systems, and computer-readable media for automatically generating computer-assistance videos based on remote interactive-guidance sessions are disclosed. In one example, an exemplary method for performing such a task may comprise: 1) detecting initiation of a remote interactive-guidance session between a local computing device and a remote computing device, 2) recording the remote interactive-guidance session, 3) storing the recorded interactive-guidance session in a media file, and then 4) providing access to the media file.

19 Claims, 7 Drawing Sheets

SYSTEMS AND METHODS FOR AUTOMATICALLY GENERATING COMPUTER-ASSISTANCE VIDEOS

BACKGROUND

Individuals are often unfamiliar with how to perform various computer-related tasks, such as common configuration and remediation tasks. In order to accomplish such tasks, individuals may seek help from technical support personnel. Some corporations have on-staff technical support personnel that can provide one-on-one training to employees. However, many individuals do not have ready access to technical guidance for common computer-related issues.

Remote-assistance solutions are sometimes used to provide technical assistance to consumers. For example, a remote-assistance application installed on both a consumer's computer and the computer of a technical support person may enable technical support to remotely view and manipulate a consumer's computer. Using the remote-assistance application, technical support personnel can assist consumers by remotely performing various computer-related tasks for the users or by remotely walking the users through these tasks. However, conventional remote-assistance applications require that sufficient technical support personnel be on hand to provide one-on-one guidance to consumers. Additionally, because remote assistance requires the use of on-hand technical support personnel, such assistance is often expensive for consumers.

SUMMARY

As will be described in greater detail below, the instant disclosure generally relates to systems and methods for automatically generating computer-assistance videos based on remote interactive-guidance sessions. In one example, an exemplary method for performing this task may comprise: 1) detecting initiation of a remote interactive-guidance session between a local computing device and a remote computing device, 2) recording the remote interactive-guidance session, 3) storing the recorded interactive-guidance session in a media file, and then 4) providing access to the media file to additional users (i.e., users that did not participate in the original interactive-guidance session).

The systems disclosed herein may automatically generate computer-assistance videos based on remote interactive-guidance sessions between a user located at a local computing device (e.g., a consumer) and a user located at a remote computing device (e.g., a technical support individual). In one example, the system may record the interactive-guidance session by recording screen captures sent from the local computing device to the remote computing device during the interactive-guidance session. The recording may also include various audio, text, and/or visual elements (e.g., visual markup) that are generated during the interactive-guidance session.

Once a recording of an interactive-guidance session has been created and stored as a media file, an individual (e.g., consumer, technical support individual, system administrator) may choose to edit portions of the media file by adding metadata (e.g., basic configuration, state, and/or troubleshooting data) or annotative data (e.g., audio, text, and/or visual data) to the media file. Additionally, a searchable index that is at least partially based on this metadata and/or the content of the media file may be created.

The automatically generated computer-assistance videos may be stored and made accessible to one or more users. For example, access to an automatically generated computer-assistance video may be opened up to users located at computing devices that are external to the local computing device. In one example, a copy of the automatically generated computer-assistance video may be stored on a storage device, such as a server or remote database, that is located remotely from the local computing device. Access to the video may then be provided by, for example, posting a link to the video on a server portal that is accessible via a network.

As will be explained in greater detail below, the systems and methods described herein may enable computer-assistance videos to be generated automatically during an interactive-guidance session. Because these videos are generated during the interactive-guidance session, cost and time expenditures associated with producing such videos may be minimized. Additionally, making such computer-assistance videos available to subsequent users may reduce additional cost and time expenditures associated with providing one-on-one training to these subsequent users. Further, providing such computer-assistance videos to subsequent users may provide these users with access to guidance that they might not otherwise be able to receive due to cost restraints and/or availability of technical personnel.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
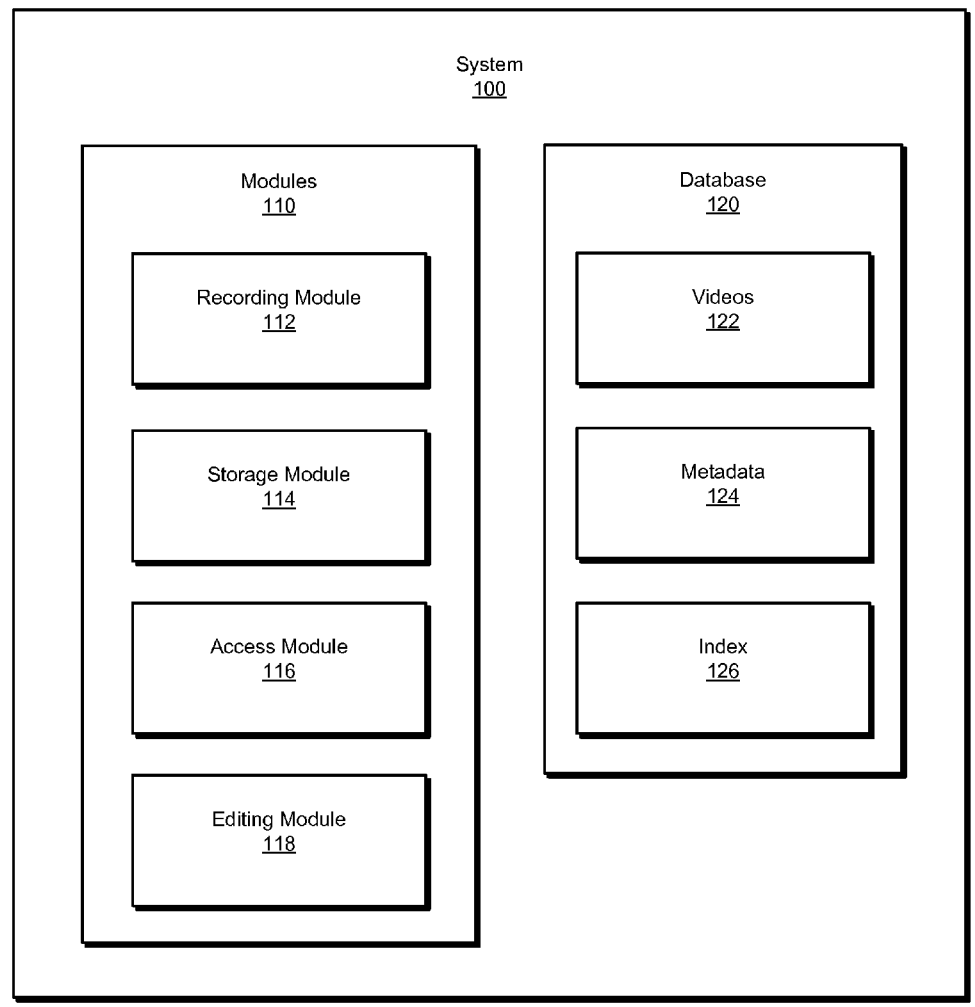
FIG. 1 is a block diagram of an exemplary system for automatically generating computer-assistance videos based on remote interactive-guidance sessions.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for automatically generating computer-assistance videos based on remote interactive-guidance sessions. The following will provide, with reference to FIGS. 1-2, detailed descriptions of exemplary systems for automatically generating such videos. Detailed descriptions of corresponding computer-implemented methods will be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for automatically generating computer-assistance videos based on remote interactive-guidance sessions. As illustrated in this figure, exemplary system 100 may comprise one or more modules 110 for performing one or more tasks. For example, and as will be explained in greater detail below, exemplary system 100 may comprise a recording module 112 programmed to automatically record and store videos of interactive-guidance sessions.

Exemplary system 100 may also comprise a storage module 114 programmed to store such videos in a media file. In addition, and as will be described in greater detail below, exemplary system 100 may also comprise an access module 116 programmed to provide access to the stored media file to additional users (i.e., users that did not participate in the original interactive-guidance session). Exemplary system 100 may additionally comprise an editing module 118 programmed to facilitate editing of the media file by a user (e.g., a consumer or technical support individual).

In certain embodiments, one or more of modules 102 in FIG. 1 may represent one or more software applications or programs that, when executed by a computing device, may cause the computing device to perform one or more tasks. For example, as will be described in greater detail below, one or more of modules 110 may represent software modules stored and configured to run on one or more computing devices, such as the devices illustrated in FIG. 2 (e.g., remote computing device 204 and local computing device 208), computing system 610 in FIG. 6, and/or portions of exemplary network architecture 700 in FIG. 7. One or more of modules 110 in FIG. 1 may also represent all or portions of one or more special-purpose computers configured to perform one or more tasks.

In additional embodiments, exemplary system 100 may comprise a database 120 for storing data, such as data generated by one or more of modules 110. For example, database 120 may comprise one or more videos 122. Videos 122 may include recordings of interactive-guidance sessions, such as guidance sessions recorded by video recording module 112. Database 120 may also comprise metadata 124. As will be explained in greater detail below, metadata 124 may include data associated with the one or more videos 122 and may be used to describe and/or index videos 122. Metadata 124 may also be used to describe and/or index various segments of videos 122. Database 120 may additionally comprise a searchable index 126 that references one or more videos 122 and/or portions of videos 122.

Database 120 in FIG. 1 may represent a portion of one or more computing devices. For example, database 120 may represent a portion of remote computing device 204, local computing device 208, and/or remote storage device 216 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as remote computing device 204, local computing device 208, and/or remote storage device 216 in FIG. 2, computing system 610 in FIG. 6, and/or portions of exemplary network architecture 700 in FIG. 7.

Figure 2:
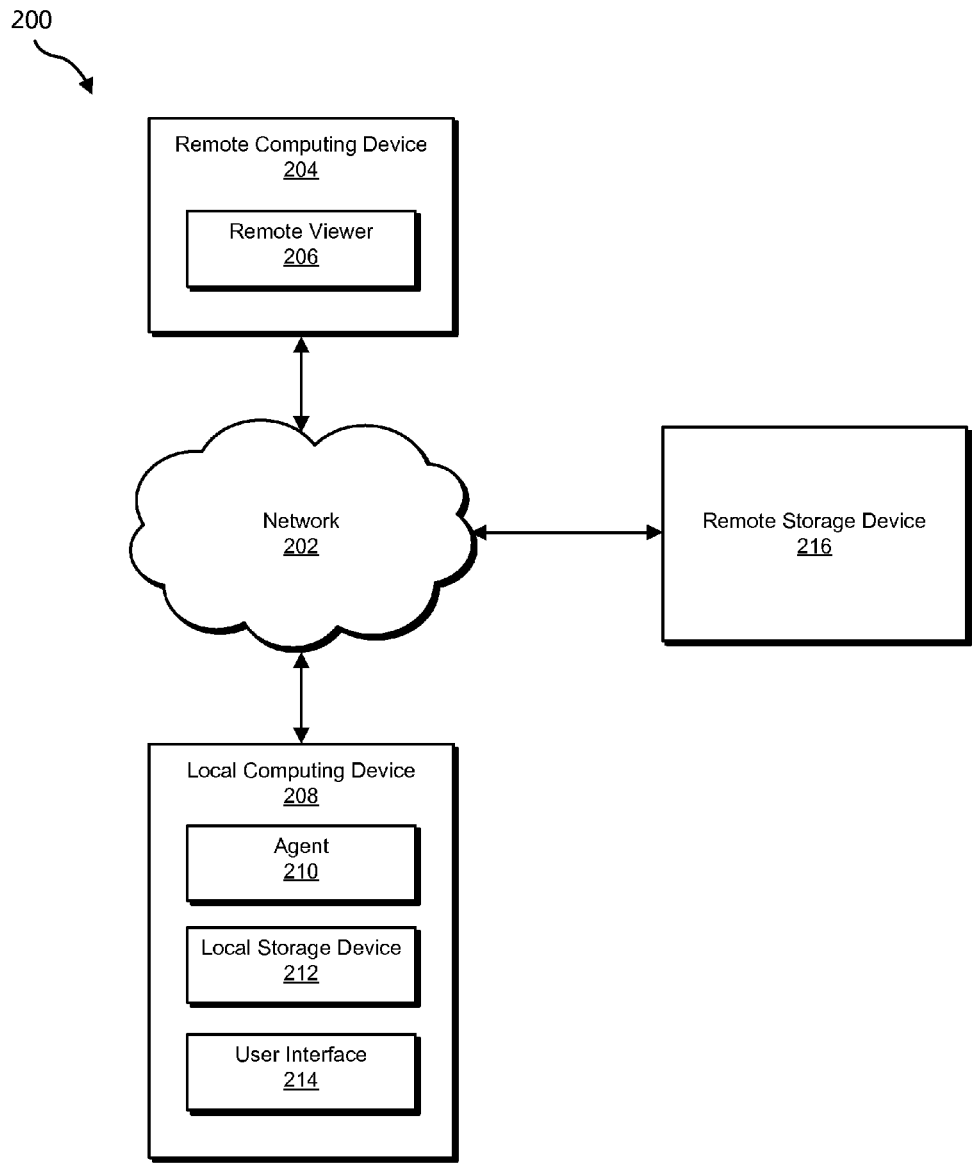
FIG. 2 is a block diagram of an exemplary system for automatically generating computer-assistance videos based on remote interactive-guidance sessions.

FIG. 2 is a block diagram of an exemplary system 200 for automatically generating computer-assistance videos based on remote interactive-guidance sessions. As illustrated in this figure, exemplary system 200 may comprise a remote computing device 204 in communication with a local computing device 208 via a network 202. In one embodiment, and as will be described in greater detail below, remote computing device 204 and/or local computing device 208 may be programmed to: 1) detect initiation of a remote interactive-guidance session between the local computing device 208 and the remote computing device 204, 2) record the remote interactive-guidance session, 3) store the recorded interactive-guidance session in a media file, and then 4) provide access to the media file to additional users.

Remote computing device 204 and local computing device 208 each generally represent any type or form of computing device capable of reading computer-executable instructions. Examples of remote computing device 204 and local computing device 208 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Remote computing device 204 may include a remote viewer 206 that allows a user (e.g., technical support individual) to interact with local computing device 208 via network 202. Local computing device 208 may comprise an agent 210 that communicates with remote viewer 206 on remote computing device 204. In one embodiment, remote computing device 204 may interact with and manipulate local computing device 208 via remote viewer 206 and agent 210.

Local computing device 208 may comprise a local storage device 212 used to store data (e.g., media files and a searchable index) generated by local computing device 208 and/or remote computing device 204. In one example, data stored in local storage device to 212 may be accessed by users of local computing device 208. Local computing device 208 may additionally comprise a user interface 214 that enables a user (e.g., a consumer) to interact with local computing device 208 and/or remote computing device 204.

Network 202 generally represents any medium or architecture capable of facilitating communication or data transfer. Examples of network 202 include, without limitation, an intranet, a wide area network (WAN), a local area network (LAN), a personal area network (PAN), the Internet, power line communications (PLC), a cellular network (e.g., GSN Network), exemplary network architecture 700 in FIG. 7, or the like. Network 202 may facilitate communication or data transfer using wireless or wired connections. In one embodiment, network 202 may facilitate communication between remote computing device 204 and local computing device 208.

In additional embodiments, exemplary system 200 may comprise a remote storage device 216. Remote storage device 216 may store data (e.g., media files and a searchable index)

generated by local computing device 208 and/or remote computing device 204. In one example, data stored in remote storage device 216 may be accessed by users of local computing device 208. Additionally, data stored in remote storage device to 216 may be made available to various third-party users through computing devices connected to network 202. For example, remote storage device 216 may be located on a server having an Internet portal that is accessible to users via network 202.

Figure 3:
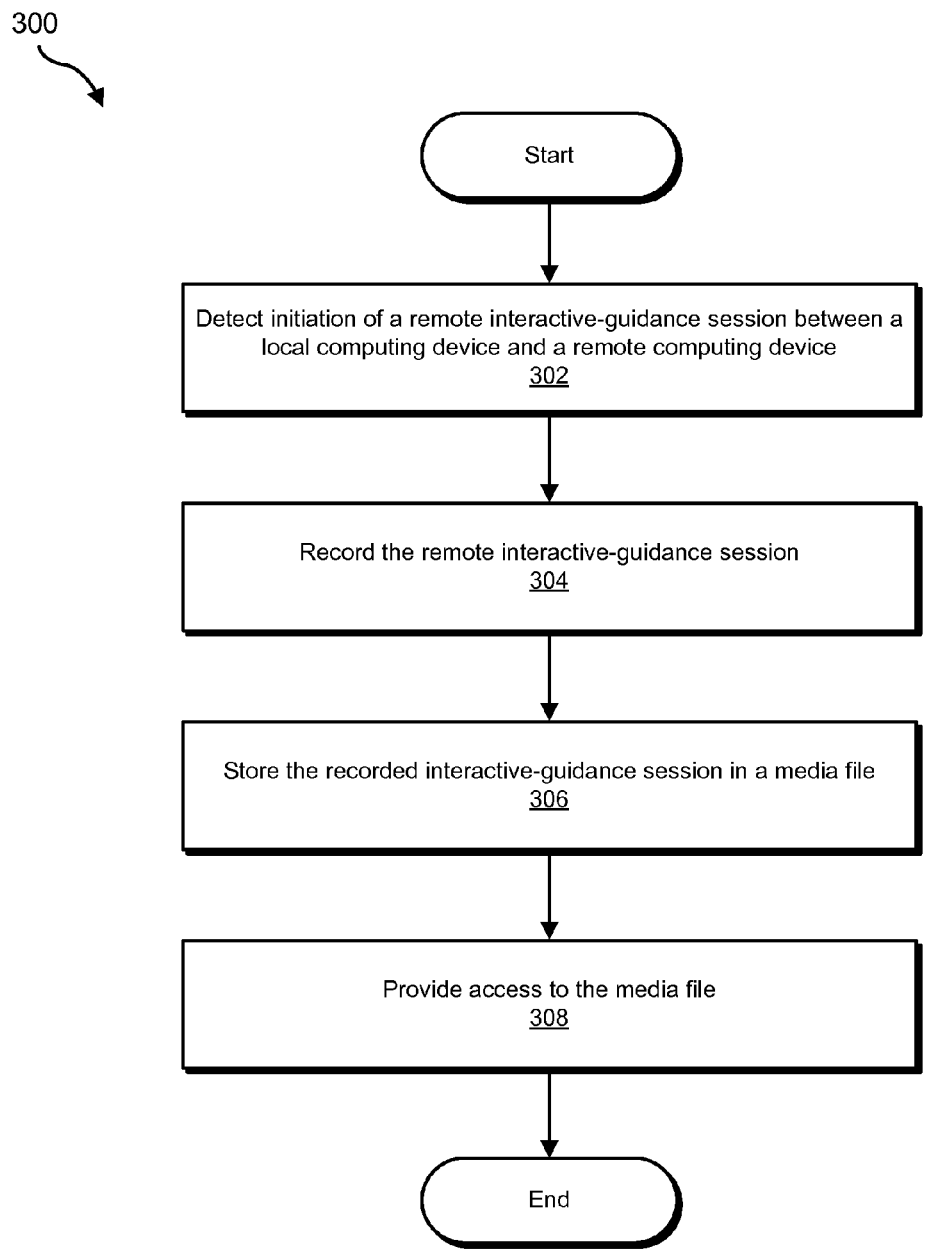
FIG. 3 is a flow diagram of an exemplary method for automatically generating computer-assistance videos based on remote interactive-guidance sessions.

FIG. 3 is a flow diagram of an exemplary computer-implemented method 300 for automatically generating computer-assistance videos based on remote interactive-guidance sessions. As illustrated in this figure, at step 302 the system may detect initiation of a remote interactive-guidance session between a local computing device and a remote computing device. For example, recording module 112 in FIG. 1 (which may, as detailed above, represent a module on remote computing device 204 and/or local computing device 208 in FIG. 2) may detect initiation of a remote interactive-guidance session between local computing device 208 and remote computing device 204.

The system may perform step 302 in a variety of ways. In one embodiment, the system may receive a communication from a user of remote computing device 204 and/or a user of a local computing device 208 indicating that a remote interactive-guidance session has been initiated, or that the session will be initiated at a particular time. For example, a user of remote computing device 204 (e.g., a technical support individual) and/or a user of local computing device 208 (e.g., a consumer) may indicate that a remote interactive-guidance session has begun between remote computing device 204 and local computing device 208. In an additional example, the system may monitor and automatically detect when a remote interactive-guidance session has been initiated between remote computing device 204 and local computing device 208.

A user of remote computing device 204 (e.g., a technical support individual) may utilize a remote interactive-guidance session to assist a user of local computing device 208 (e.g., a consumer) with a variety of computer-related tasks, such as common configuration and remediation tasks. During the remote interactive-guidance session, a user of remote computing device 204 may interactively assist a user of local computing device 208 with various computer-related tasks. In one embodiment, a user of remote computing device 204 may provide assistance to a user of local computing device 208 by remotely manipulating local computing device 208. For example, a user of remote computing device 204 may utilize a remote viewer 206 to remotely view a visual representation of a display device of local computing device 208 (e.g., an image of local computing device display 510 in FIG. 5).

The visual representation of the display device on local computing device 208, as seen on remote viewer 206, may be substantially identical to a view seen by a user of local computing device 208. A user of remote computing device 204 (e.g., a technical support individual) may utilize the image of local computing device 208 shown on remote viewer 206 as a guide to manipulate local computing device 208. For example, a user of remote computing device 204 may manipulate various visual elements shown on remote viewer 206 (e.g., buttons, icons, text fields, etc.), thereby manipulating corresponding visual elements shown on a device display of local computing device 208. Manipulating the visual elements shown on the device display of local computing device 208 may cause various software functions associated with the visual elements on local computing device 208 to be executed.

In some embodiments, a user of remote computing device 204 may assist a user of local computing device 208 by remotely performing tasks on local computing device 208. Additionally, a user of remote computing device 204 may assist a user of local computing device 208 by providing audio and/or text directions instructing the user of local computing device 208 how to perform various computer-related tasks. The user of local computing device 208 may then perform actions on local computing device 208 in accordance with the instructions. In some examples, the user of remote computing device 204 may also provide visual markup that is visible to the user of local computing device 208. The visual markup may help the user of local computing device 208 to identify various visual elements on a display of local computing device 208. The visual markup may also instruct the user of local computing device 208 how to execute various tasks on local computing device 208.

During an interactive-guidance session, a user of local computing device 208 who is being assisted by a user of remote computing device 204 may interact with the user of remote computing device 204 through audio data, visual data, and/or text data. For example, a user of local computing device 208 may direct an audible inquiry or comment to a user of remote computing device 204. In some examples, a user of local computing device 208 may submit a written inquiry or comment to a user of remote computing device 204. A user of local computing device 208 may also use visual markup to identify and inquire about visual elements on a display of local computing device 208.

Once the system has detected initiation of a remote interactive-guidance session, at step 304 the system may record the remote interactive-guidance session. For example, recording module 112 in FIG. 1 (which may, as detailed above, represent a module on remote computing device 204 and/or local computing device 208 in FIG. 2) may record the remote interactive-guidance session as it is conducted between local computing device 208 and remote computing device 204.

In one embodiment, recording module 112 may be located on local computing device 208. For example, recording module 112 may be located on agent 210 on local computing device 208, enabling recording module 112 to record the interactive-guidance session from the viewpoint of a user of local computing device 208. In additional embodiments, recording module 112 may be located on remote computing device 204 or any other suitable computing device having access to local computing device 208 and/or remote computing device 204.

Figure 4:
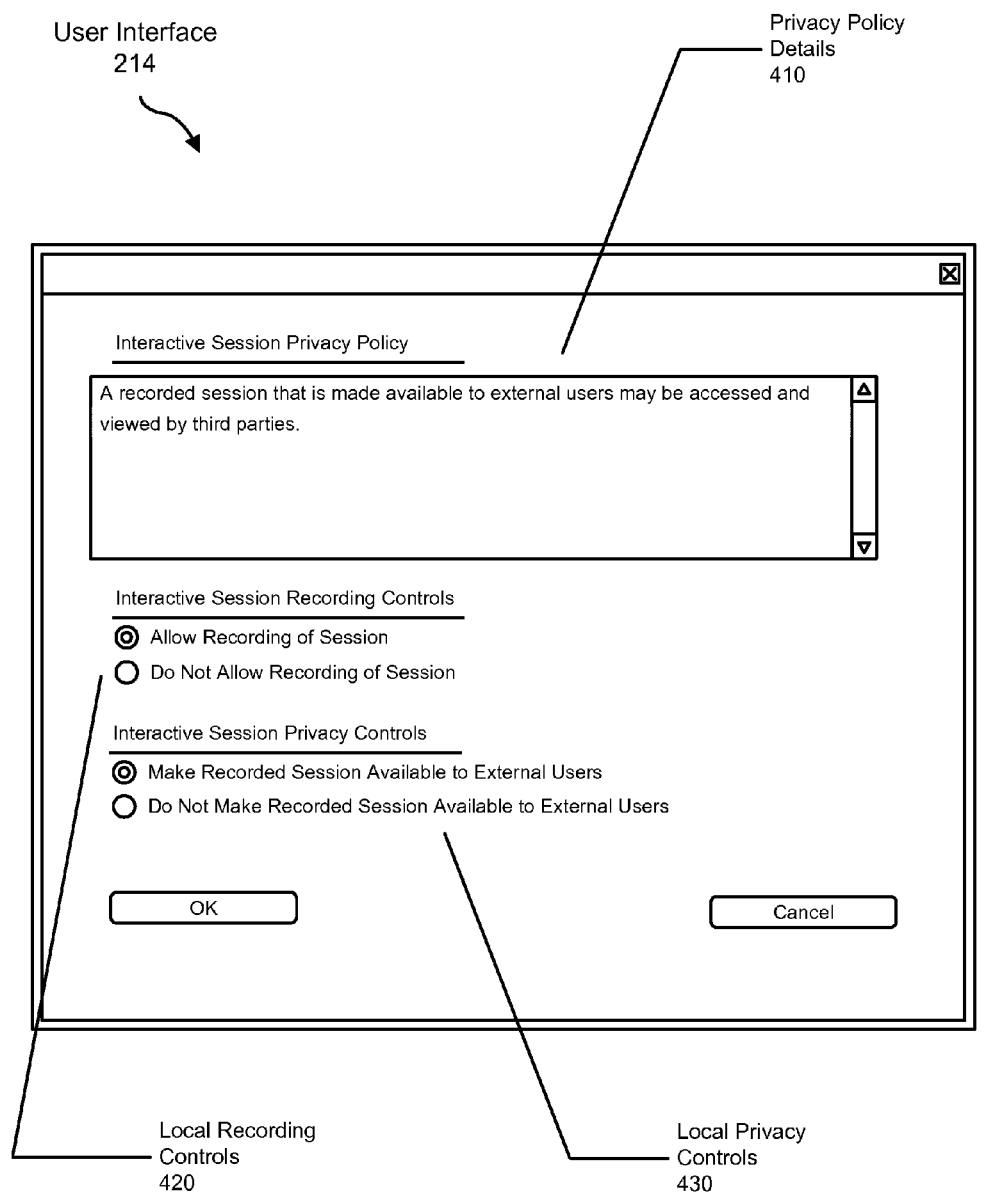
FIG. 4 is an illustration of a user interface provided on a local computing device.

In some examples, recording module 112 may require that a user of local computing device 208 approve recording of the interactive-guidance session prior to commencing recording. For example, as illustrated in FIG. 4, user interface to 214 on local computing device 208 may provide local recording controls 420 that enable a user of local computing device 208 to choose whether or not to proceed with recording of a particular session. In some examples, recording module 112 may also require that a user of local computing device 208 first approve storage of a recorded interactive-guidance session prior to storing the recorded session as a media file. A user of local computing device 208 may be given the option to approve or deny storage of the recorded interactive-guidance session before, during, and/or after the interactive-guidance session is conducted.

User interface 214 may additionally include privacy policy details 410 that present a privacy policy governing a recorded interactive-guidance session. In some examples, privacy policy details 410 may present varying levels of privacy that the user may choose from. User interface 214 may also include local privacy controls 430 that allow a user to choose a desired level of privacy. For example, privacy controls 430 may include an option to make a recorded interactive-guidance session available to users external to local computing device 208, as well as an option to make the recorded session available only to local users of local computing device 208.

If a user chooses to make the interactive-guidance session available to users external to local computing device 208, the recorded session may be stored on a storage device (e.g., remote storage device 216) that is accessible by parties other than a user of local computing device 208. For example, a recorded interactive-guidance session stored on remote storage device 216 may be accessible by third parties via network 202. In some examples, a link to a recorded interactive-guidance session may be posted on a website portal available to users having access to the website portal.

Figure 5:
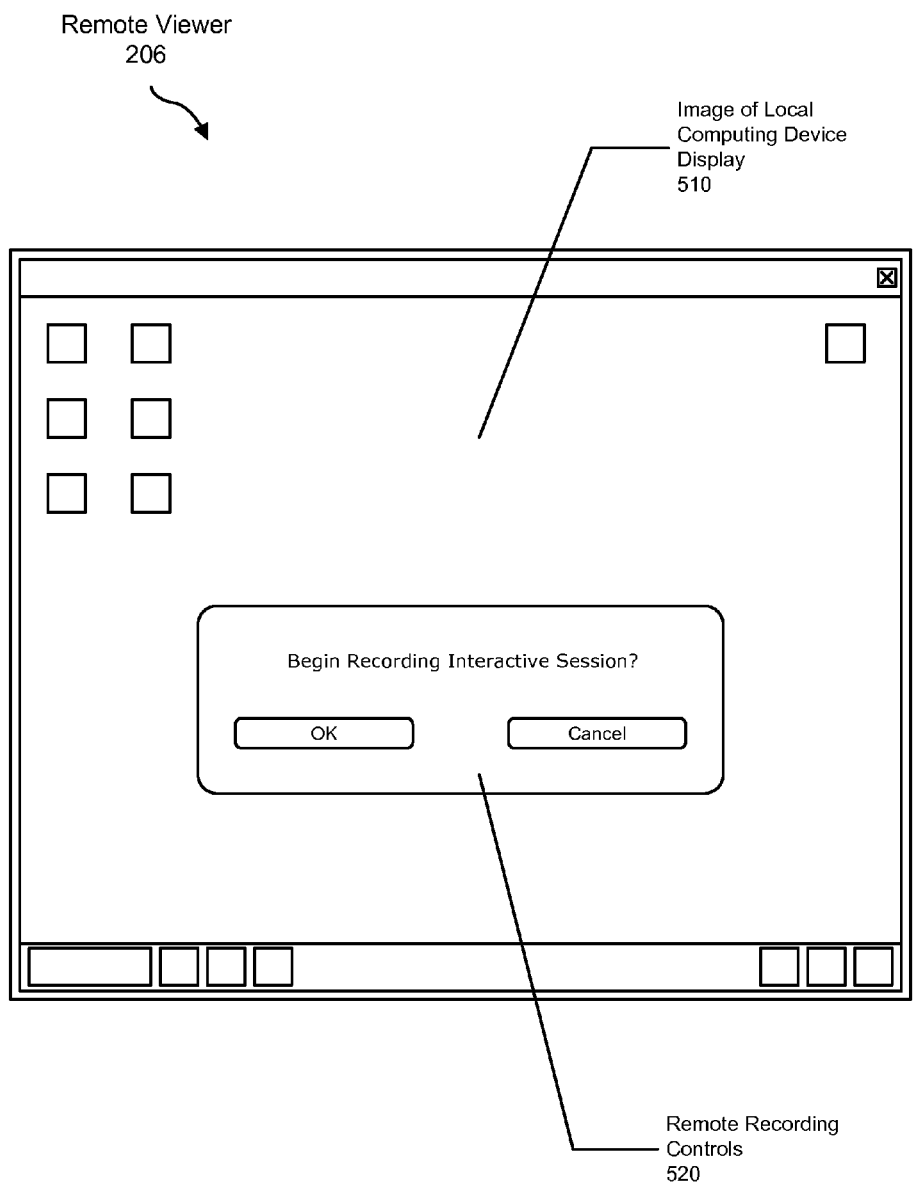
FIG. 5 is an illustration of a remoter viewer provided on a remote computing device.

In various examples, recording module 112 may require that a user of remote computing device 204 (e.g., a technical support individual) approve recording of the interactive-guidance session prior to commencing recording. For example, as illustrated in FIG. 5, remote viewer 206 on remote computing device 204 may comprise remote recording controls 520, which may enable a user of remote computing device 204 to choose whether or not to proceed with recording of a particular session. As also shown in FIG. 5, remote viewer 206 may display an image of local computing device display 510. In some examples, remote computing device 204 may also include privacy policy controls (e.g., local privacy policy controls 430) that enable a user of remote computing device 204 to select a privacy policy before commencing with recording.

Returning to FIG. 3, recording module 112 may record any suitable aspects of an interactive-guidance session. For example, recording module 112 may record screen captures sent from local computing device 208 to remote computing device 204 during the interactive-guidance session. The screen captures may represent visual elements displayed on a display device of local computing device 208. Recording module 112 may also record any additional aspects of the interactive-guidance session, including, for example, audio data, text data, and/or other visual data generated during the interactive-guidance session. Audio data recorded by recording module 112 may include audio instructions, inquiries, and/or comments generated by a user of remote computing device 204 and/or a user of local computing device 208.

Text data recorded by recording module 112 may include text-based markup of visual elements on a display device of local computing device 208. Text data recorded by recording module 112 may also include textual instructions, inquiries, and/or comments made by a user of remote computing device 204 and/or a user of local computing device 208 (e.g., chat text). Visual data recorded by recording module 112 may include additional visual elements generated during the interactive-guidance session, such as visible markups of elements on a display device of local computing device 208.

Returning to FIG. 3, at step 306 the system may store the recorded interactive-guidance session in a media file. For example, storage module 114 in FIG. 1 (which may, as detailed above, represent a module on remote computing device 204 and/or local computing device 208 in FIG. 2) may store the recorded interactive-guidance session in a media file. In at least one example, the media file may be stored in local storage device 212 located on local computing device 208 and/or in any suitable storage location, such as, for example, remote storage device 216.

In various embodiments, once a media file has been stored in local storage device 212, user interface 214 may present a user of local computing device 208 with an option to make the media file available to users located external to local computing device 208. For example, a user of local computing device 208 may be provided with an option to store a copy of the media file on remote storage device 216 or any other suitable external storage location.

In some examples, a user of local computing device 208 (e.g., a consumer), a user of remote computing device 204 (e.g., a technical support individual), and/or any other designated individual (e.g., a system administrator) may be provided with an option to edit and/or delete a media file stored on local storage device 212, remote storage device 216, and/or any other suitable storage location. For example, editing module 118 in FIG. 1 (which may, as detailed above, represent a module on remote computing device 204 and/or local computing device 208 in FIG. 2) may edit the media file based on instructions from a user.

Editing the media file may comprise adding data to the media file and/or removing data from the media file. In some embodiments, editing the media file may comprise adding annotative data to the media file. Annotative data may include, for example, visual data, audio data, and/or text data. For example, a user may edit a media file by marking up portions of the recorded video with visual and/or text data. A user may also edit a media file by adding audio commentary to the recorded video, the audio commentary being stored as audio data.

Additionally, editing a media file may comprise removing sensitive information from the media file. A media file may be edited to obscure and/or otherwise remove sensitive information, including, without limitation, a user's name, home address, and/or e-mail address. For example, sensitive visual elements in a recorded video may be visually blacked-out and/or segments of the recorded video containing sensitive information may be removed entirely.

In some embodiments, metadata may also be added to the media file. For example, editing module 118 in FIG. 1 may add metadata to the media file. The metadata may identify at least one characteristic of the remote interactive-guidance session. The metadata may comprise information associated with the media file, such as, for example, a software profile and/or hardware profile of local computing device 208. A software profile of local computing device 208 may include, for example, a profile identifying an operating system, a service pack, and/or a list of all applications and services installed on local computing device 208. A software profile may also include a profile of local computing device 208 prior to and following the remote interactive-guidance session, with the profile showing various changes made to local computing device 208 over the course of the remote interactive-guidance session. Similarly, a hardware profile of local computing device 208 may include a list of all hardware installed on local computing device 208.

Metadata added to the media file may also comprise at least one computer-assistance issue that was addressed during the remote interactive-guidance session. For example, the metadata may comprise key words and/or phrases identifying a particular computer-assistance issue. In additional embodiments, metadata added to the media file may comprise troubleshooting data generated during the remote interactive-guidance session. For example, if a user is attempting to identify a particular error in a software program run on local computing device 208, a software program may be directed to generate log files that identify the particular error. At least a portion of these log files may be included in the metadata as troubleshooting data.

According to various embodiments, editing module 118 in FIG. 1 may create a searchable index for a stored media file. The searchable index may be based, at least in part, on the content of the media file and/or any metadata associated with the media file. In some examples, the searchable index may enable a user to search for portions of the media file using one or more terms contained in the searchable index. Additionally, the searchable index may contain information relating to multiple media files. Accordingly, the searchable index may enable a user to search for media files containing particular search terms contained within the searchable index. For example, a user may locate a stored media file that relates to a particular software problem faced by the user.

As further shown in FIG. 3, at step 308 the system may provide access to a stored media file. For example, access module 118 in FIG. 1 (which may, as detailed above, represent a module on remote computing device 204 and/or local computing device 208 in FIG. 2) may provide additional users (i.e., users that did not participate in the interactive-guidance session recorded in step 304) with access to the media file stored in step 306.

In some examples, access module 118 may only enable a user of local computing device 208 to access the media file, while excluding access by other users. For example, access module 118 may allow any user of local computing device 208 to access the media file. In additional examples, access module 118 may only allow specified users of local computing device 208 to access the media file.

In additional examples, access module 118 may provide access to parties external to local computing device 208. For example, a recorded interactive-guidance session stored on remote storage device 216 may be accessible by various users external to local computing device via network 202. In some examples, a link to the recorded interactive-guidance session may be posted on a website portal and may be accessible to users having access to the website portal. Access module 118 may also provide users with access to a searchable index (e.g., index 126 in FIG. 1) that references to one or more stored media files.

As detailed above, the systems and methods described herein may enable computer-assistance videos to be generated automatically during an interactive-guidance session. Because these videos are generated during the interactive-guidance session, cost and time expenditures associated with producing such videos may be minimized. Additionally, making such computer-assistance videos available to subsequent users may reduce additional cost and time expenditures associated with providing one-on-one training to these subsequent users. Further, providing such computer-assistance videos to subsequent users may provide these users with access to guidance that they might not otherwise be able to receive due to cost restraints and/or availability of technical personnel.

Figure 6:
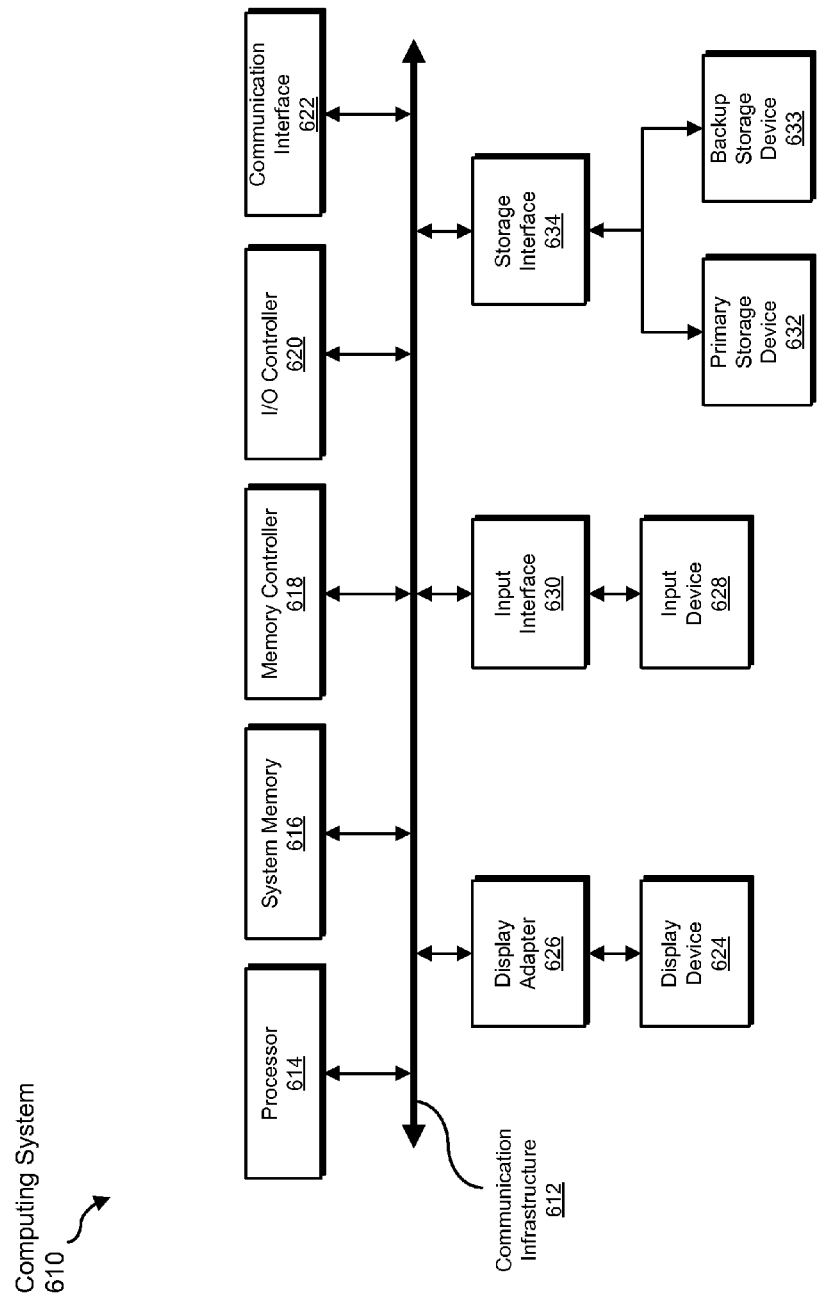
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the detecting, recording, storing, providing, adding, creating, editing, and requiring steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6, computing system 610 may comprise a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as detecting, recording, storing, providing, adding, creating, editing, and requiring.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the detecting, recording, storing, providing, adding, creating, editing, and requiring steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 694 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the detecting, recording, storing, providing, adding, creating, editing, and requiring steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the detecting, recording, storing, providing, adding, creating, editing, and requiring steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the detecting, recording, storing, providing, adding, creating, editing, and requiring steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
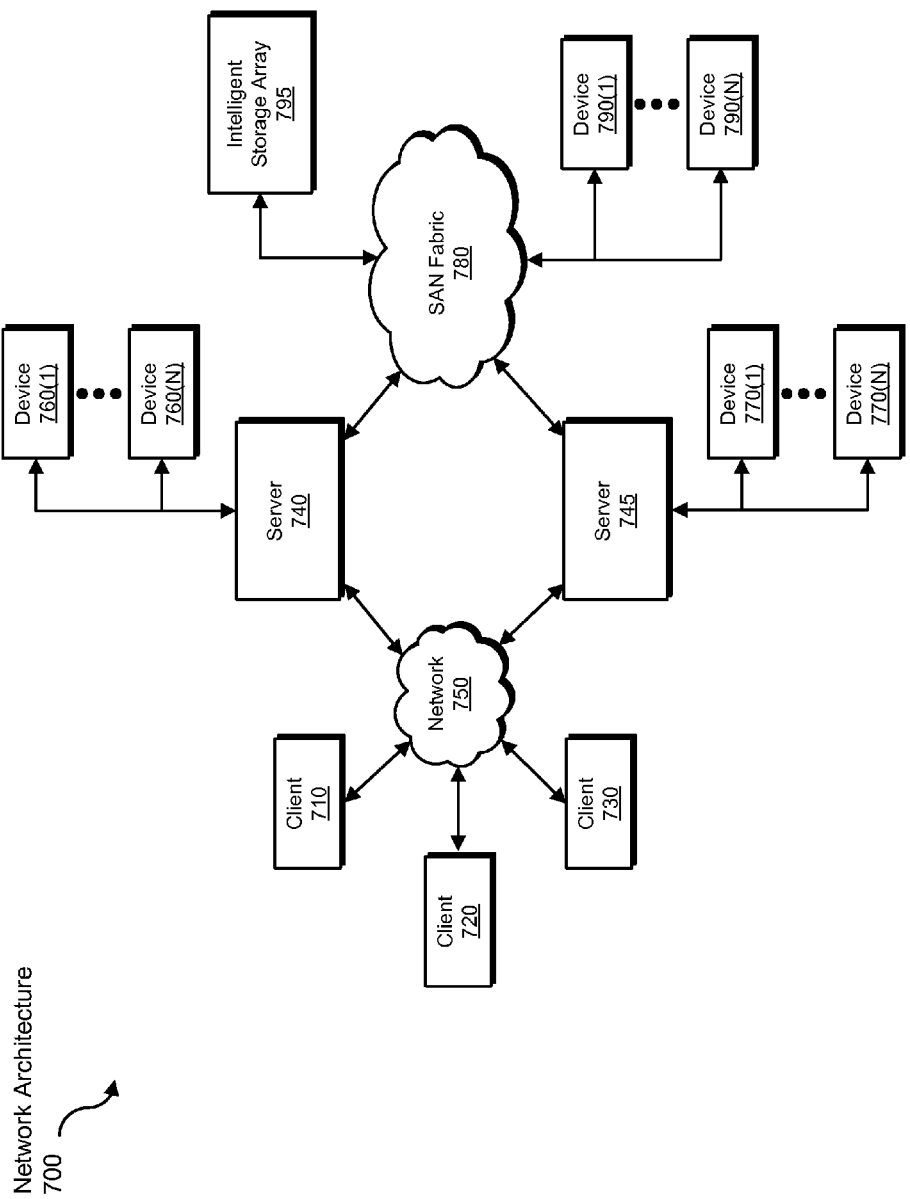
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the detecting, recording, storing, providing, adding, creating, editing, and requiring steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for automatically generating computer-assistance videos based on remote interactive-guidance sessions. In one example, this exemplary method may comprise: 1) detecting initiation of a remote interactive-guidance session between a local computing device and a remote computing device, 2) recording the remote interactive-guidance session, 3) storing the recorded interactive-guidance session in a media file, and then 4) providing access to the media file.

Detecting initiation of the remote interactive-guidance session may comprise: 1) receiving a request from a user of the local computing device to record a remote interactive-guidance session and 2) receiving a request from a user of the remote computing device to record a remote interactive-guidance session.

Recording the remote interactive-guidance session may comprise recording screen captures sent from the local computing device to the remote computing device during the interactive-guidance session. The screen captures may represent visual elements displayed on a display device of the local computing device. Recording the remote interactive-guidance session may additionally comprise recording at least one of: 1) audio data generated during the remote interactive-guidance session, 2) text data generated during the remote interactive-guidance session, and 3) visual data generated during the remote interactive-guidance session.

Storing the media file may comprise at least one of: 1) storing the media file on the local computing device and 2) storing the media file on a remote storage device. The exemplary method may also comprise adding, to the media file, metadata that identifies at least one characteristic of the remote interactive-guidance session. The metadata may comprise information that identifies at least one of: 1) a software profile of the local computing device, 2) a hardware profile of the local computing device, 3) at least one computer-assistance issue addressed during the remote interactive-guidance session, and 4) troubleshooting data generated during the remote interactive-guidance session.

The exemplary method may additionally comprise creating, based at least in part on the metadata and content of the media file, a searchable index for the media file. In some examples, providing access to the media file may comprise providing at least one additional user with access to at least one of the media file and the searchable index.

In one example, the exemplary method may comprise editing the media file. Editing the media file may comprise adding annotative data to the media file. The annotative data may comprise at least one of visual data, audio data, and text data. In some examples, editing the media file may comprise removing sensitive information from the media file.

In some examples, the exemplary method may also comprise at least one of: 1) requiring that a user of the local computing device approve recording of the interactive-guidance session and 2) requiring that a user of the local computing device approved storing of the recorded interactive-guidance session.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for automatically generating computer-assistance videos based on remote interactive-guidance sessions, at least a portion of the method being performed by a computing system comprising at least one processor, the method comprising:
   detecting initiation of a remote interactive-guidance session during which a technical support individual operating a remote computing device provides assistance to a user of a local computing device;
   recording at least a portion of the assistance provided by the technical support individual to the user of the local computing device during the remote interactive-guidance session;
   storing the recorded assistance provided during the remote interactive-guidance session in a media file;
   adding, to the media file, metadata comprising information that identifies at least one software or hardware change remotely made to the local computing device during the remote interactive-guidance session by the technical support individual;
   creating, based at least in part on the metadata, a searchable index for the media file;
   providing access to the media file using the searchable index.

2. The computer-implemented method of claim 1, wherein recording the assistance provided during the remote interactive-guidance session comprises recording screen captures generated during the remote interactive-guidance session, the screen captures representing visual elements displayed on a display device of the local computing device or the remote computing device.

3. The computer-implemented method of claim 1, wherein recording the assistance provided during the remote interactive-guidance session further comprises recording at least one of:
   audio data generated during the remote interactive-guidance session;
   text data generated during the remote interactive-guidance session;
   visual data generated during the remote interactive-guidance session.

4. The computer-implemented method of claim 1, wherein the information that identifies at least one software or hardware change made to the local computing device during the remote interactive-guidance session comprises at least one of:
   information that identifies both a software profile of the local computing device prior to the remote interactive-guidance session and a software profile of the local computing device subsequent to the remote interactive-guidance session;
   information that identifies both a hardware profile of the local computing device prior to the remote interactive-guidance session and a hardware profile of the local computing device subsequent to the remote interactive-guidance session.

5. The computer-implemented method of claim 1, wherein the metadata further comprises information that identifies at least one of:
   at least one computer-assistance issue addressed during the remote interactive-guidance session;
   troubleshooting data generated during the remote interactive-guidance session.

6. The computer-implemented method of claim 1, wherein providing access to the media file comprises providing at least one additional user with access to at least one of:
   the media file;
   the searchable index.

7. The computer-implemented method of claim 1, further comprising editing the media file.

8. The computer-implemented method of claim 7, wherein editing the media file comprises adding annotative data to the media file.

9. The computer-implemented method of claim 8, wherein the annotative data comprises at least one of:
   visual data;
   audio data;
   text data.

10. The computer-implemented method of claim 7, wherein editing the media file comprises removing sensitive information from the media file.

11. The computer-implemented method of claim 1, wherein detecting initiation of the remote interactive-guidance session comprises:
- receiving a request from the user of the local computing device to record the remote interactive-guidance session;
- receiving a request from the technical support individual operating the remote computing device to record the remote interactive-guidance session.

12. The computer-implemented method of claim 1, further comprising at least one of:
- requiring that the user of the local computing device approve recording of the interactive-guidance session;
- requiring that the user of the local computing device approve storing of the recorded interactive-guidance session.

13. The computer-implemented method of claim 1, wherein storing the media file comprises at least one of:
- storing the media file on the local computing device;
- storing the media file on a remote storage device.

14. A system for automatically generating computer-assistance videos based on remote interactive-guidance sessions, the system comprising:
- a recording module programmed to:
  - detect initiation of a remote interactive-guidance session during which a technical support individual operating a remote computing device provides assistance to a user of a local computing device;
  - record at least a portion of the assistance provided by the technical support individual to the user of the local computing device during the remote interactive-guidance session;
- a storage module programmed to:
  - store the recorded assistance provided during the remote interactive-guidance session in a media file;
  - add, to the media file, metadata comprising information that identifies at least one software or hardware change remotely made to the local computing device during the remote interactive-guidance session by the technical support individual;
- an access module programmed to:
  - create, based at least in part on the metadata, a searchable index for the media file;
  - provide access to the media file using the searchable index;
- at least one processor configured to execute at least one of the recording module, the storage module, and the access module.

15. The system of claim 14, wherein the storage module is further programmed to facilitate editing of the media file.

16. The system of claim 15, wherein the storage module facilitates editing of the media file by facilitating the removal of sensitive information from the media file.

17. The system of claim 14, wherein the metadata further comprises information that identifies at least one of:
- at least one computer-assistance issue addressed during the remote interactive-guidance session;
- troubleshooting data generated during the remote interactive-guidance session.

18. The system of claim 14, wherein the recording module is further programmed to:
- require that the user of the local computing device approve recording of the remote interactive-guidance session;
- require that the user of the local computing device approve storing of the recorded remote interactive-guidance session.

19. A computer-readable storage medium comprising one or more computer-executable instructions that, when executed by at least one processor of a computing device, cause the computing device to:
- detect initiation of a remote interactive-guidance session during which a technical support individual operating a remote computing device provides assistance to a user of a local computing device;
- record at least a portion of the assistance provided by the technical support individual operating the remote computing device to the user of the local computing device during the remote interactive-guidance session;
- store the recorded assistance provided during the remote interactive-guidance session in a media file;
- add, to the media file, metadata comprising information that identifies at least one software or hardware change remotely made to the local computing device during the remote interactive-guidance session by the technical support individual;
- create, based at least in part on the metadata, a searchable index for the media file;
- provide access to the media file using the searchable index.

* * * * *